United States Patent [19]

Ruff

[11] Patent Number: 5,784,541
[45] Date of Patent: Jul. 21, 1998

US005784541A

[54] SYSTEM FOR CONTROLLING MULTIPLE CONTROLLABLE DEVICES ACCORDING TO A SCRIPT TRANSMITTED FROM A PERSONAL COMPUTER

[76] Inventor: John D. Ruff, 206 Birch St., Alexandria, Va. 22305

[21] Appl. No.: 588,473

[22] Filed: Jan. 18, 1996

[51] Int. Cl.$^6$ .............................. G06F 3/00; G06F 3/02; G06F 3/14
[52] U.S. Cl. ..................... 395/82; 395/173; 395/174; 395/84; 395/704
[58] Field of Search ................... 395/173, 174, 395/175, 92, 82, 83, 84, 704

[56] References Cited

U.S. PATENT DOCUMENTS

| 4,454,576 | 6/1984 | McInroy et al. ............ 364/200 |
| 5,202,963 | 4/1993 | Zelley ....................... 395/325 |

Primary Examiner—Christopher B. Shin
Assistant Examiner—Rehana Perveen

[57] ABSTRACT

A simplified system using a computer to control the operation (e.g.. speed) of multiple controllable devices (e.g.. electric motors) so that a script for a sequence of operations of the controllable devices can be prepared and edited. using ASCII characters, on the computer monitor. This script is stored on the computer disc drive and can be played back through the computer's printer port to control the controllable devices to perform the sequence of operations. Each letter of the alphabet identifies a different control parameter of a controllable device, and each line of the script contains one letter for each device being controlled. On playback. the first line is scanned and the written control parameters are set and activated. After about 1/20 of a second the next line is similarly scanned and the control parameters are again adjusted to the current script requirements. Playback then proceeds in the same manner, line by line, through the script. A long script can control up to eighty-five (or more) motors or devices for some hours. The system can be used to control numerous other devices including but not limited to lights, fountains, audio oscillators, massaging machines, simulators, muscle stimulation machines, computer numerical control systems, motorized actuation systems for puppet animation, and machines for playing musical instruments.

4 Claims, 5 Drawing Sheets

| BIT NUMBERS | | | | | | | | 0 0 0 | 0 0 1 | 0 1 0 | 0 1 1 | 1 0 0 | 1 0 1 | 1 1 0 | 1 1 1 |
|---|---|---|---|---|---|---|---|---|---|---|---|---|---|---|---|
| b7 | b6 | b5 | b4 | b3 | b2 | b1 | COLUMN / ROW | 0 | 1 | 2 | 3 | 4 | 5 | 6 | 7 |
| | | | 0 | 0 | 0 | 0 | 0 | NUL | DLE | SP | 0 | @ | P | ` | p |
| | | | 0 | 0 | 0 | 1 | 1 | SOH | DC1 | ! | 1 | A | Q | a | q |
| | | | 0 | 0 | 1 | 0 | 2 | STX | DC2 | " | 2 | B | R | b | r |
| | | | 0 | 0 | 1 | 1 | 3 | ETX | DC3 | # | 3 | C | S | c | s |
| | | | 0 | 1 | 0 | 0 | 4 | EOT | DC4 | $ | 4 | D | T | d | t |
| | | | 0 | 1 | 0 | 1 | 5 | ENQ | NAK | % | 5 | E | U | e | u |
| | | | 0 | 1 | 1 | 0 | 6 | ACK | SYN | & | 6 | F | V | f | v |
| | | | 0 | 1 | 1 | 1 | 7 | BEL | ETB | ' | 7 | G | W | g | w |
| | | | 1 | 0 | 0 | 0 | 8 | BS | CAN | ( | 8 | H | X | h | x |
| | | | 1 | 0 | 0 | 1 | 9 | HT | EM | ) | 9 | I | Y | i | y |
| | | | 1 | 0 | 1 | 0 | 10 | LF | SUB | * | : | J | Z | j | z |
| | | | 1 | 0 | 1 | 1 | 11 | VT | ESC | + | ; | K | [ | k | { |
| | | | 1 | 1 | 0 | 0 | 12 | FF | FS | , | < | L | \ | l | \| |
| | | | 1 | 1 | 0 | 1 | 13 | CR | GS | - | = | M | ] | m | } |
| | | | 1 | 1 | 1 | 0 | 14 | SO | RS | . | > | N | ^ | n | ~ |
| | | | 1 | 1 | 1 | 1 | 15 | SI | US | / | ? | O | _ | o | DEL |

SYSTEM FOR CONTROLLING MULTIPLE CONTROLLABLE DEVICES ACCORDING TO A SCRIPT TRANSMITTED FROM A PERSONAL COMPUTER

BACKGROUND OF THE INVENTION

1. Technical Field

The present invention pertains to pre-programmed computer control of controllable devices having variable settings. For example, the present invention may be applied to mechanical animation of imitation human or animal figures by providing lifelike movements of limbs and other parts of the figures. The motive force for these movements can be derived from electric motors, or from hydraulic (or pneumatic) actuators controlled by solenoid valves activated by the control system. A separate reversible motor or actuator (channel of control) can be used for each part of the figure being animated.

2. Discussion of Prior Art

Currently, and by way of example, animation is typically achieved with closed loop servo-systems. These systems usually have accurate control of positioning by encoder feedback. However these systems are somewhat complex and since an animated figure may have thirty or more axes of movement (channels of control), cost is a very big factor. Another matter of concern is the degree of difficulty of writing the script. Sophisticated servo-systems require writing a relatively complex set of commands to control their motors. Achieving lifelike movements of the animated figures requires that motor speeds be adjusted frequently. Adjusting speeds twenty times per second is desirable, so if a typical system used thirty closed-loop servo motor drives (thirty channels of control), it would require a large amount of writing, if the system is to run for any appreciable length of time.

The objective of the present invention is to provide an improved system for computer control of multiple controllable devices (e.g. speed and direction of animation motors) in repeatable programs (e.g. performances), which is simpler to operate and less expensive than the currently available systems.

SUMMARY OF THE INVENTION

The simplified system, as applied to electric motors for animation of mechanical figures which is an example of only one of its many applications, uses open loop control, directly controlling the speed of each motor by varying the frequency of pulses sent to it. The pulse frequency sent to a given motor can be increased in progressive steps, causing the motor to speed up, or it can be decreased, causing the motor to slow down. In a typical application of the invention, fifteen steps of variation are identified in the writing or editing phase (and reproduced in the playback phase) by letters of the alphabet using the ASCII code. The script may be stored on the computer disc drive and played back through the printer port to control the motors. Forward movement is prescribed by upper case letters and reverse movement (at the same speed) is prescribed by the same letters in lower case. A line of the script (as displayed on the monitor) contains a letter of the alphabet for each of the (typical number of) thirty motors being controlled. The priority of the letter determines the speed of that particular motor at that part of the script. For example, the letter "A" typically specifies the fastest speed in a clockwise rotation while the letter "N" typically specifies the slowest speed, with the symbol "@" specifying a dead stop. The letters "a" and "n" (in lower case) then specify the fastest and slowest speeds in a counter-clockwise rotation. On each of the subsequent lines of script there is the same number (i.e., thirty) of letters, and the letters for the various motors are always presented in the same order, so that the letters for a given motor are present in a vertical column. This arrangement makes it easy to see what each motor is to be doing at a given time, and to compare it with other motor movements at that same time. This is important since coordination of the movements of different parts of the figure is usually necessary. It can be seen that setting the speed of a motor at a specific time is very easy, usually requiring only one keystroke.

Some movements of an animated figure are simpler than others and do not require as many steps of speed variation, so that the control circuitry for that motor is less complex. For example, the motor used to move an eyelid to blink may do quite well with only three speed variations while the motor moving a replica of a human arm may need fifteen steps of speed variation to appear lifelike. Usually a maximum of twenty-six steps could be used. The eye-blink motor can usually be a simple, small, stepper motor while the motor for the arm may need the full range of speed variation, and be a much larger, more sophisticated motor.

However, the open loop system will always be cheaper, and easier to script than the closed loop servo systems. The positioning capability of the system is not as accurate as with a closed loop system, but it is quite suitable for the purpose of animation. The user can write events at various locations in the script where the positions of the motors are corrected by positive positioning, to correct for any accumulated minor slippage between actual and planned positions. In this disclosure such correcting is called "centering".

Most simple existing animation systems are repetitious, and thus appear fake or unreal. However, because of the increased script capability of the system, it can control more than eighty-five motors for durations of several minutes or hours without once exactly repeating a movement or combination of movements. During play back, the script is scanned one line at a time with the written motor speeds set and activated after scanning each line. The script is scanned typically at a rate of one line every 1/20 of a second. The result of the present invention is a much more lifelike performance.

The open loop control of the present invention may be applied to numerous controllable devices including but not limited to electric light displays, fountain displays, pre-recorded performances synchronizing music with lights or water, music production, actuators for string puppets, massage machines, systems for material handling, simulators of multiple movements (e.g. simulators of flight or amusement park rides), apparatus for stimulation of muscles, apparatus for playing musical instruments and any other controllable devices in substantially the same manner described above for the animation motors.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein like reference numerals in the various figures are utilized to designate like components, and wherein.

DESCRIPTION OF THE PREFERRED EMBODIMENTS

Figure 1:
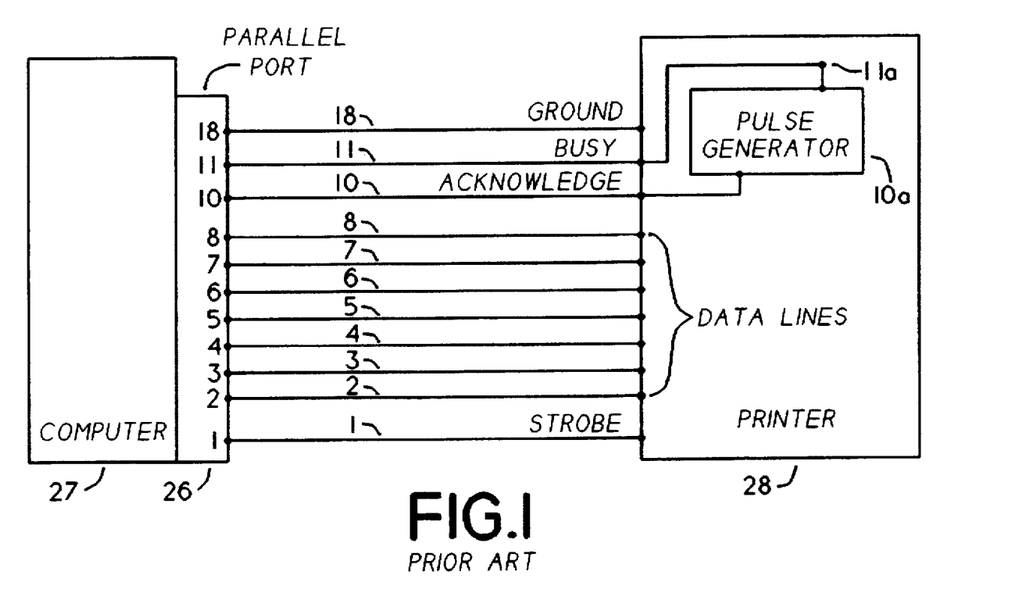
FIG. 1 shows a typical arrangement of a computer controlling a printer through a standard IBM parallel port.

The first step in describing the present invention is to show state of the art methods by which a PC (personal computer), typically an IBM or IBM compatible XT or later model, controls a printer through a standard IBM parallel port. In FIG. 1 of the accompanying drawings, strobe line 1, data lines 2, 3, 4, 5, 6, 7, 8, acknowledge line 10, busy line 11, and ground line 18 connect the parallel port 26 of computer 27 electrically to printer 28. The numbering of these parallel port lines matches the pin number assignments of the standard IBM, 25 pin parallel port connector. A typical word processing program such as WordPerfect 5.0 can be used. The printer selection should be made for "standard printer". In operation, busy line 11 is held high by the printer control circuitry whenever the printer is not ready to receive data; such as when the printer is still processing the previous data presented on data lines 2, 3, 4, 5, 6, 7, 8. When all previous data have been processed by accepting the data into the printer buffers, the printer sends a signal to the computer to indicate that it is no longer busy, by bringing busy line 11 low through internal busy terminal 11a. Bringing busy terminal 11a low also signals pulse generator 10a to cause the normally high acknowledge line 10 to pulse low briefly. In some arrangements this pulse causes the computer to present new data on data lines 2, 3, 4, 5, 6, 7, 8. The new data represent the next character or command to be accepted, but in many arrangements new data will be presented without the pulse on acknowledge line 10 by responding only to the bringing low of busy line 11. In a short time, typically 1 microsecond after the data change, the computer pulses strobe line 1 low. This pulse initiates acceptance of the new data into the printer buffers and causes the printer control circuitry to send busy line 11 high again. Busy line 11 is held high until the data are accepted, at which time it goes low again, as already described. This process is repeated continuously. The three essential events in the method described above are:

(1) The data are changed.

(2) The strobe is pulsed, and the busy line is engaged.

(3) The busy line is disengaged.

In another word processing program (Textra V4.0), a different sequence of the events is used, and the data changed immediately after the strobe pulse, instead of immediately before it, in the following manner:

(1) The strobe is pulsed, and the busy line is engaged.

(2) The data are changed.

(3) The busy line is disengaged.

Either of these methods work equally well with the system, since in both cases the data are changed and the strobe pulsed to accept the changed data, in a regulated cycle. The system works successfully with any such computer programs that use a strobe signal to accept the data on the printer data lines, and a "not busy" signal to initiate the computer changing the data and pulsing the next strobe signal.

Figure 2:
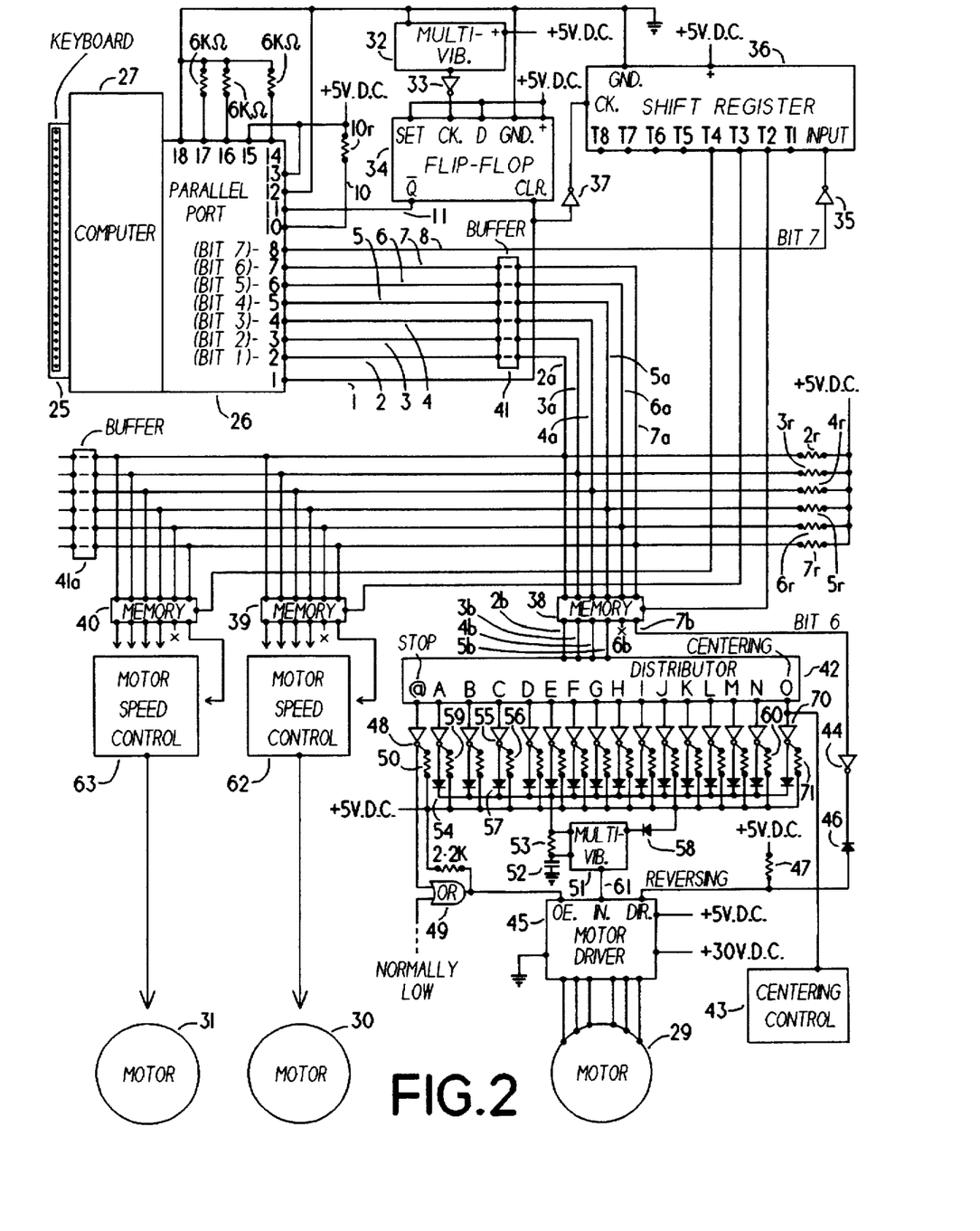
FIG. 2 is a schematic electrical circuit diagram showing the overall basic structure and operation of the invention.

In an alternative simplified method, which can be used with either of the two programs mentioned above, pulse generator 10a can be omitted, as shown in FIG. 2, and acknowledge line 10 can be unconnected to the printer, or held permanently high. In that arrangement the bringing of busy line 11 low is the sole signal which causes the computer to present new data on data lines 2, 3, 4, 5, 6, 7, 8. This can be accomplished when working with simple printing tasks, such as those of the present invention, without making any changes in the computer programs or computer hardware, simply by disconnecting acknowledge line 10.

In the present invention, the distribution circuitry shown in FIG. 2 takes the place of a printer so that data on the output of the parallel port is distributed by this circuitry to control multiple controllable devices, for example multiple motors, instead of being used to control a printer. To prepare the script for a sequence of animation operation, computer 27 should be programmed for "word processing" or any other program which allows a document containing letters of the alphabet to be prepared and entered via a keyboard 25 or other conventional input device (e.g. mouse, voice, touch screen etc.) line by line on screen, stored on disc, and then sent through parallel port 26 to a printer, or as in this invention, to the substitute distribution circuitry. To allow the computer to operate with the substitute circuitry, as shown in FIG. 2, paper out line 12 should be grounded, with select line 13 and error line 15 held high, at +5 V DC. Also, auto feed line 14, initialize line 16, and select input line 17 should be grounded through 6K ohm resistors. The numbering of these parallel port lines matches the pin number assignments of the standard IBM, 25 pin parallel port connector.

Often a large number of motors (channels of control) are used, however, as few as a single motor may be used and to simplify the following illustration, only motors 29, 30, 31 are shown. At the start of the script preparation, assume motor 29 is to run very slowly in a forward direction, motor 30 is stopped, and motor 31 is to run at about three-quarter speed in the reverse direction. With the above described fifteen steps of speed variation, a typical first line of the script, entered via keyboard 25, would then be "N@d", with the upper case "N" specifying forward direction at low speed, "@" specifying "stop", and lower case "d" specifying reverse direction at three-quarter speed. The choice of upper case or lower case thus determines direction, with the earlier letters of the alphabet determining faster speeds, the later letters determining slower speeds, and the character "@" determining a stopped condition. At the end of the line of script a "carriage return" is used by typically striking ENTER on the keyboard, to start a new line. If there was to be no change of speeds for a few lines, the text of the script would be repeated, thus:

N@d
N@d
N@d
N@d

Playback speed is typically about twenty lines per second.

Proceeding again with the preparation of the script, if motor 30 was to be started up at one-half speed, in reverse direction, at this point in the script, the script would then continue as:

Nhd
Nhd
Nhd
Nhd

It can be seen that in this manner the script can specify that each of the motors separately, can be stopped, reversed, or run at any desired speed within their range. Since there are fifteen steps of speed variation, and since speeds can be changed twenty times per second, speed transitions can be very smooth, and in fact imperceptible. However, it should be understood that a script is by nature quite voluminous, and a script for two minutes of animation is about forty pages long, at the twenty lines per second rate. Slower rates can be used if desired.

After a script has been prepared, it is stored as a "document" on either a floppy disc or the hard drive of the computer. Then to replay the script to control the motors for a performance, the computer is set in the "print" mode, or if a word processing program is not used, the mode could simply be described as "output from the parallel port". Refer now to FIG. 2 as operation of the system is described. With the print mode engaged, and with data on data lines 2, 3, 4, 5, 6, 7, 8, free-running astable multivibrator 32 sends a pulse through inverter 33 to the clock input (CLK) of flip-flop 34 (typically a TTL 7474 IC). This sends the Q(complementary) output from flip-flop 34 low, which brings busy line 11 low, sending a "not busy" signal to the computer. In reply to this signal, the computer pulses the normally high strobe line 1 low, which causes the data on the data lines to be accepted. This action will be described later. The computer then puts new data on data lines 2, 3, 4, 5, 6, 7, 8. Also, when strobe line 1 pulses low, it causes flip-flop 34 to clear (CLR). This sends the Q(complementary) output of flip-flop 34 high again, which sends a "busy" signal to the computer via busy line 11. This "busy" condition holds until multivibrator 32 clocks flip-flop 34 again. Multivibrator 32 continues to generate pulses independently at regular intervals of about 1/80 second, and at each pulse it clocks flip-flop 34 as already described. A sequence of negative pulses on strobe line 1 thus continues indefinitely, at a typical rate of eighty pulses per second. The response time of the computer to "not busy" signals on busy line 11 is very short compared to the timing cycle of multivibrator 32. The data on the data lines change after each pulse, so that the data at each pulse represent a new letter in the script, or a command to the distribution circuitry. Acknowledge line 10 is held high by 2.2K ohm resistor 10r, which is connected to the 5 V DC supply. The above description of the circuitry shown in FIG. 2 relates to the programmed sequence wherein the data on the data lines are changed immediately after the strobe signal, not immediately before. The same circuitry can be used if the program controls a sequence with the data changing immediately before the strobe signal.

Figure 3:
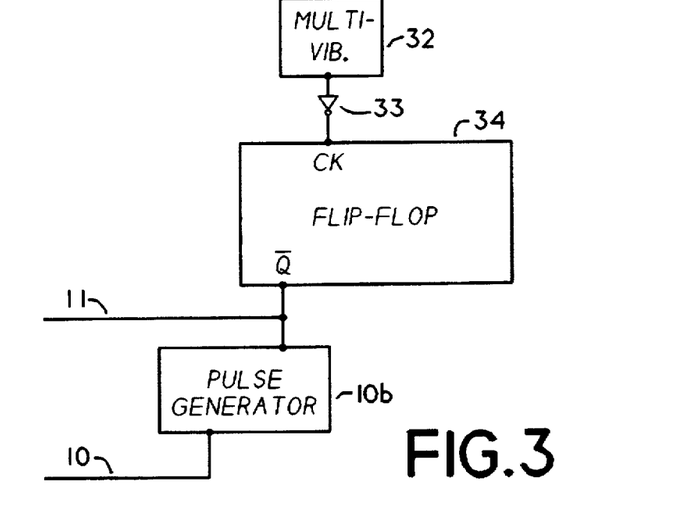
FIG. 3 shows an alternative embodiment in which an "acknowledge" pulse is generated.

As described earlier and shown in FIG. 1, another common embodiment for controlling a printer includes the use of a pulse generator 10a to send a pulse on acknowledge line 10. Refer now to FIG. 3 and flip-flop 34. When the flip-flop is clocked by multivibrator 32 it sends busy line 11 low as already described. At the same time, this low signal on busy line 11 causes the pulse generator 10b to send a brief pulse on acknowledge line 10 to the parallel port of the computer. This signal on acknowledge line 10 is the request for new data, and in reply the computer pulses strobe line 1 low and immediately puts new data on data lines 2, 3, 4, 5, 6, 7, 8, as described with FIG. 1. The use of this acknowledge line pulse generator may be needed with some more complex computer programs, but is not necessary with simple programs and hardware. Also some programs or computer hardware may require other acknowledge line pulse circuit arrangements, but as long as production of the acknowledge line pulse is associated with the low signal on busy line 11, these arrangements can be considered state of the art, and the hardware to produce any such acknowledge line pulses can be included within the scope of the invention. Pulse generator 10b can be considered as a substitute for circuitry already present in printers, as shown with pulse generator 10a in FIG. 1, and would simply produce pulses with the same timing and characteristics as those produced by printer circuitry.

Figure 4:
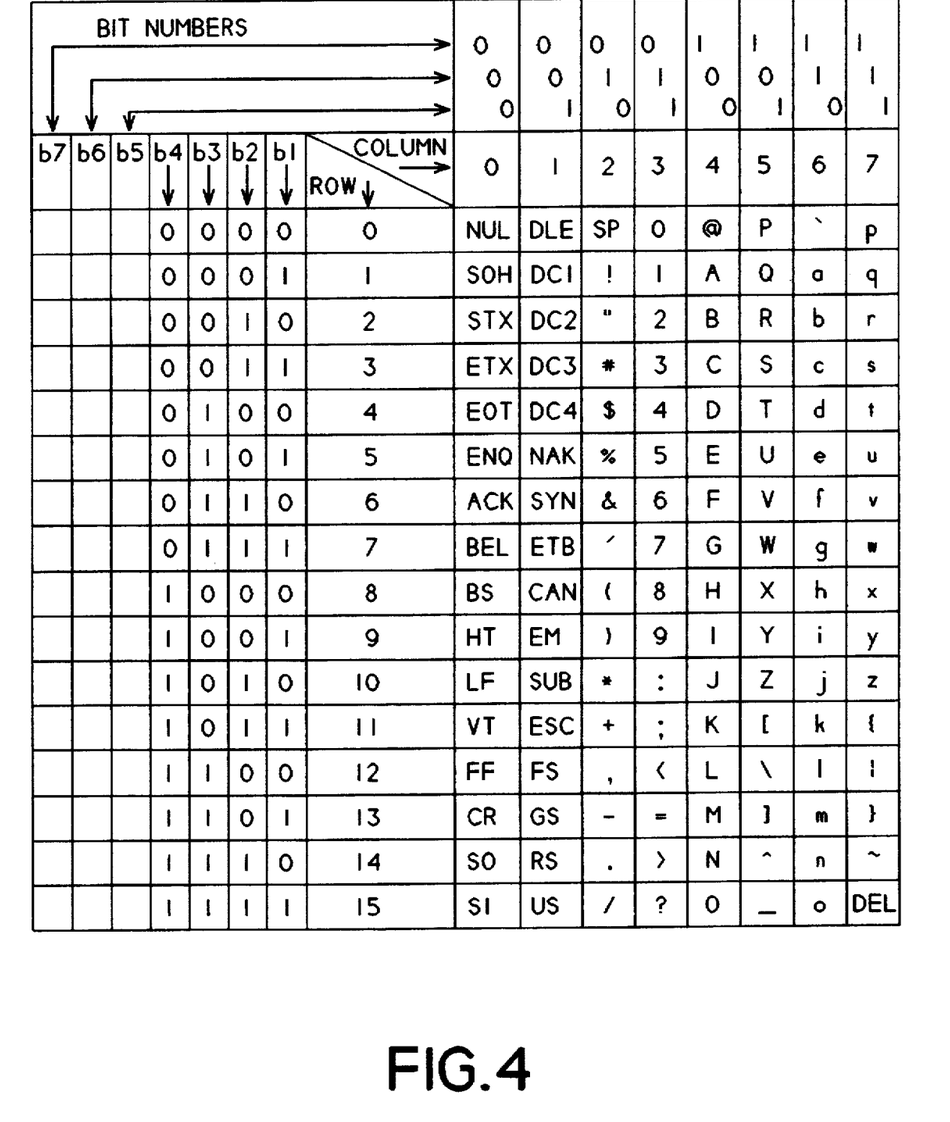
FIG. 4 is a reproduction of the standard ASCII computer code.

After the last letter in a line of script has been represented on the data lines, the next data will represent the carriage return command (CR). The computer printing program should be set so that a line feed command (LF) is not used, and an auto feed mode is used. However a method using the LF command is described later. The carriage return command is ignored as motor speed control data, as will be explained later, but it plays an important part in controlling the distribution of data. FIG. 4 shows the standard seven-bit ASCII computer code which is used with the system, however, a computer can be alternatively programmed to operate the system with any other computer code which encodes letters, numbers and commands as data bits carried on the data lines. Referring to FIG. 4, characters represented by ASCII codes are placed in a table designated by rows and columns. The column number of the particular character represents the most significant three bits of the ASCII code for that character (i.e., bits b7, b6, b5) while the row number represents the least significant four bits of the code (i.e., bits b4, b3, b2, b1). The seven-bit ASCII code therefore includes the three-bit column number concatenated with the four-bit row number. It can be seen that the CR command is in column "0". Bit #7 (i.e., b7) represents commands in this column with a data bit value of "0". The letters of the alphabet are in columns four through seven and bit #7 represents these letters with a data bit value of "1". This different representation by bit #7 between commands and alphabet letters is important, and is used to separate the CR commands from the letters during playback. In FIG. 2, bit #7 is carried on data line 8, which is connected through inverter 35 to the serial input (INPUT) of shift register 36, (typically an eight bit, 74164, serial input, parallel output register).

Strobe line 1 is connected through inverter 37 to the clock (CLK) of shift register 36. Then, in playback operation, after the playback of a line of letters, data representing CR (carriage return) will be present on the data lines. At that time, data line 8 (bit #7) will be low, causing inverter 35 to bring the serial input of shift register 36 high. At this same time, the pulse on strobe line 1 is inverted by inverter 37 to clock the register with a positive edge pulse. The data value of "1" on the input then goes to idle position T1 on the register. The next data on the data lines will represent the first letter of the next line of script. Since these data will represent a character from columns four or six (in FIG. 4), data line 8 will now be high again, and serial input of the register will be at a data value of "0". With the accompanying pulse from strobe line 1, the data "1" at position T1 with a value of "1" goes to position T2, which causes acceptance and latching of the data representing the first letter of the new line into memory 38, where the data are held. On the next pulse of strobe line 1, the data representing the second letter of the line of script are on the data lines, and when this pulse clocks register 36, the data "1" at position T2 with a value of "1" goes to position T3, which causes latching of the second letter data into memory 39, where the data are held. On the next pulse of strobe line 1, the data representing the third letter is similarly latched into memory 40. In this manner register 36 acts as a selector which switches the memories 38, 39, 40 (typically 74174 ICs) to be latched as they receive their appropriate data. The data on data lines 2, 3, 4, 5, 6, 7 first go to buffer/driver 41 (typically a 7417 IC with 2.2K ohm resistors 2r, 3r, 4r, 5r, 6r, 7r) which provides a greater current capability to drive the multiple memory inputs (additional buffer(s), 41a, may be added as necessary). Data transmitted from buffer/driver 41 are on data lines 2a, 3a, 4a, 5a, 6a, 7a. After the last letter of the line of script has been latched in, the next pulse moves the data "1" from position T4 with a value of "1" on to position T5 which is an idle position. At this time new data with a value of "1" is entered into the input of the register for the next line of the script. The following pulses move the old data with a value of "1" on through idle positions T6, T7, T8, after which it is lost, and the new data with a value of "1" is moved through positions T1, T2, T3, T4 for this next line. Only the positions T1, T2, T3, T4 are used in this example, and idle positions T5, T6, T7, T8 are not connected, but they could be used if more than three motors were to be controlled. To control an even larger number of motors, registers with an appropriately large number of positions can be used, or a number of registers can be cascaded to provide any needed number of channels.

It should be noted that the only time a data value of "1" is present at the serial input of the register is while the CR command (or any other data represented in columns zero through three of FIG. 4) is present on the data lines. The data having a value of "1" is then transferred as described, to positions T1, T2, T3, T4, T5, T6, T7, T8, but no other data having a value of "1" is fed into the input of the register until the line of script has been completed and the CR command is sent again to start the next line. When preparing a script, a CR command should be written before the first line of the script. If this is not done there will be no playback of the first line; nevertheless all following lines will be played back normally.

As described, the positive edge of the output from position T2 of shift register 36 clocks memory 38, and the data on the input at the instant of clocking are latched in and presented at outputs 2b, 3b, 4b, 5b, 6b, 7b. Outputs 2b, 3b, 4b, 5b (bits #1,#2,#3,#4) are fed as data inputs to distributor 42 (typically a 74154, 1-of-16 data distributor). Distributor 42 decodes these input data to bring low the one of its sixteen output terminals that corresponds to the appropriate row of commands or characters (see FIG. 4) being represented by these data inputs. The other fifteen output terminals of distributor 42 remain high. This selected output of distributor 42 remains low (and the others remain high) until the next positive edge clocking of memory 38, at which time the data on data lines 2a, 3a, 4a, 5a are presented to distributor 42 for decoding, and for changing of the selected output, if the script requires a change at that point. The output terminals of distributor 42 are marked @, A, B, C, D, E, F, G, H, I, J, K, L, M, N, O in FIG. 2. Terminal @ is used for the "stop" position, and terminal O is used for "centering", through centering circuit 43, which will be described later.

To explain the overall operation, assume an example wherein when memory 38 is clocked, terminal C goes low. This would indicate that the data coming from the computer are representing a script entry in row three (see FIG. 4). It is obvious that the script entry must be for a letter, since a carriage return (CR) command could not be present with the clocking signal coming from T2 of the register. Thus the script entry must have been in one of columns four through seven. But columns five and seven (letters P through Z, plus some punctuation marks) are not being used in the system being shown in FIG. 2, so the script entry must be in columns four or six, which specify either forward speed C, (upper case) or reverse speed c, (lower case).

Forward speed C is in column four, and if a letter from this column were specified in the script, bit #6 (i.e., b6) would have a data value of "0" on data lines 7 and 7a. So when memory 38 is clocked the data bit having a value of "0" goes via line 7b to inverter 44, bringing its output high, thus maintaining a high condition of the forward/reverse selector (DIR) of stepper motor driver 45, with diode 46 and resistor 47, which has a typical value of 10K ohms. This causes driver 45 to drive motor 29 in a forward direction. If the script entry was a lower case c, (in column six) the resulting data value of "1" for bit #6 would bring the inverter 44 output low, which brings the forward/reverse selector low, causing motor rotation in the reverse direction. Forward/reverse control of the motors is controlled at all speeds by bit #6 in this manner.

When the @ output terminal of distributor 42 goes low it is calling for motor 29 to be stopped. The output of inverter 48 then goes high and brings the output enable (OE) of the motor driver high, through "OR" gate 49, thus stopping the motor. Resistor 50 (typically 2.2K ohms) maintains the voltage high at the output of open collector inverter 48, (typically a 7416 IC). All of the sixteen output terminals of distributor 42 are connected to similar open collector inverters, and use various sized current control resistors to control capacitor charging currents, for various pulse frequencies of pulse generator 51.

Pulse generator 51 is a free-running astable multivibrator (typically a 555 timer IC) with an external capacitor 52 (typically 0.1 µf), and a discharge resistor 53 (typically 1K ohms), through which charging current from the capacitor flows to common line 54, and to the network of diodes and resistors connected to the inverters at the output terminals of distributor 42. For example, when the letter C is being represented on playback, the C output terminal of distributor 42 goes low. This causes the output of inverter 55 to go open, and allow a positive voltage to be present, under the influence of current control resistor 56. Current then flows to the 5 V supply, through resistor 56, through diode 57, through common line 54, through resistor 53, while charging capacitor 52. The size of resistor 56 determines the current flow rate, and thus the charging time of capacitor 52. This determines the pulse frequency of pulse generator 51, while output terminal C is low. Combinations similar to that of inverter 55, current control resistor 56, and diode 57, are used at all output terminals of distributor 42, but with variations of the sizes of the current control resistors to give a variety of speeds. Control of the frequency of multivibrators by varying the resistance of the charging resistor in this manner is a well known practice, but any other type of variable frequency pulse generator arrangement, which responds to a selected output from the data distributor can be used. Because there is some voltage drop across the diodes (such as diode 57), and because the 555 IC functions as a voltage comparator, a matching diode 58 is used for compensation on the power supply line to the pulse generator 51. Since the letter C represents a relatively high speed, the value of resistor 56 is relatively low (typically 6.5K ohms, giving a pulse frequency of about 1,700 Hz). Current control resistor 59 controls the fastest speed, represented at output terminal A, and its typical value would be 3K ohms, giving a pulse frequency of about 2,900 Hz. The slowest speed, with output terminal N, is controlled by current control resistor 60, typically 1M ohms, giving a pulse frequency of about 15 Hz. The values of all the other current control resistors are such that their sizing is increased in steps, from the fastest speed to the slowest.

When a selected output of distributor 42 goes low, all the fifteen other (inactive) outputs are high; so that these high outputs bring their respective inverters low, and these inverters sink current through their respective current control resistors. Also to prevent current flowing from these fifteen low inverter outputs to common line 54, diodes similar to diode 57 are used with all the inverters, for isolation.

Pulse line 61 connects pulse generator 51 to stepper motor driver 45, which is typically a unipolar 5804 IC manufactured by Allegro Micro Systems, Inc., driving a 1.8 degree/ step, stepper motor 29. Other driver and motor combinations can be used, with the necessary appropriate changes in the sizing of the current control resistors to allow for differing motor speeds and pulse frequencies. Distributor 42, with the shown associated sixteen sets of inverters, resistors and diodes, is combined with pulse generator 51, motor driver 45, and connected circuitry, to comprise a translator/motor speed control unit. Similar speed control units 62, 63 are used with motors 30, 31, but are not shown in detail since they are essentially the same as the speed control unit of motor 29, although they may have some minor differences, due to possible different driver/motor combinations. The embodiment described above employs stepper motors, but the invention is not restricted to that type of motor. Any other type of motor and drive system in which rotation speed is directly proportional to the controlling frequency of a fluctuating electrical current can alternatively be used.

As an alternative to using the system to drive motors, pulse generator 51 can be replaced by an audio oscillator whose output is fed to an amplifier and speaker to produce music. The current control resistors need to be calibrated to match the chromatic scale, or any other musical scale. One channel of control can be used for music and other channels used simultaneously to control motors, or other devices.

All the ICs shown in FIG. 2 are supplied with 5 V DC, and with a ground common to computer 27, through ground line 18. Motor driver 45 has a 5 V D.C. power supply connection for internal logic, and an independent DC motor drive power supply, typically 30 V DC. Throughout this disclosure, and by way of example, all ICs are shown utilizing TTL with the exception of special purpose devices such as stepper motor drivers. The embodiments may also be implemented utilizing ICs or other components having other logic combinations (e.g., DTL, ECL, etc.).

Multivibrator 32 is required to generate pulses at a typical rate of 80 Hz in the system shown in FIG. 2. First, assume a new line of script is scanned every $\frac{1}{20}$ second. Since four pulses are needed for every line to process the three letters in the line and the carriage return (CR) command, multivibrator 32 needs to generate eighty pulses per second (i.e., four pulses every $\frac{1}{20}$ of a second). If there were more letters in the line (more channels of control) while still scanning every $\frac{1}{20}$ second, the frequency of multivibrator 32 would have to be increased. For example if the system were controlling ten channels the frequency would be (10 +1)× 20=220 Hz.

An alternative arrangement might be to have the computer programmed to produce the strobe pulses independently at the predetermined frequency, and to change the data on lines 2, 3, 4, 5, 6, 7, 8 after each strobe pulse. These strobe pulses can be fed directly into the clock terminal of register 36. In this arrangement, acknowledge line 10, busy line 11, multivibrator 32, flip-flop 34, and their associated circuitry would be eliminated.

As mentioned above, the system can be operated with an existing word processing program, or with a simplified program which performs similar basic functions such as writing and editing a script document as already described, saving that document to disc, retrieving the data of the document, and outputting it through the parallel port of the computer. If an existing word processing program is used, the line format must be set so there is no left hand margin. This is necessary because left hand margins would cause a number of space (SP) commands between the CR command and the first letter of the following line. This would interfere with the sequence of operation. Similarly since all scripts will have a number of pages, the page format must be set so there is no top or bottom margins. This allows the script to proceed uninterrupted from the last line of one page to the first line of the next page. Top or bottom page margins would cause a number of extra line feed (LF) commands to interrupt the sequence.

Figures 5, 6:
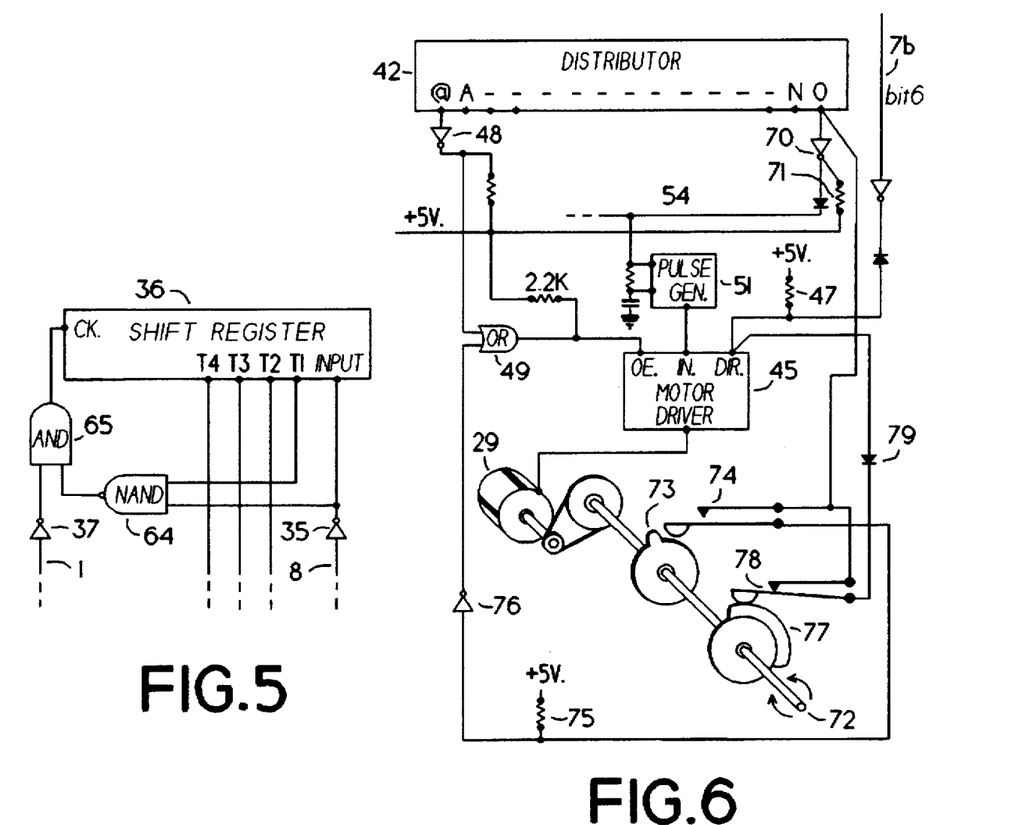
FIG. 5 shows an alternate method of accepting a "carriage return" command.
FIG. 6 shows an arrangement for "centering" the position of an actuated output shaft.

As mentioned earlier, it is best to set the computer printing program in an auto feed mode to avoid the line feed (LF) command; however if the word processing program in use does not allow the auto feed mode, the method shown in FIG. 5 can be used. As explained with FIG. 2 when a carriage return (CR) command is received, a data "1" is entered at the INPUT of shift register 36, and since the next data received will always represent a letter, a data "0" will then be entered into the INPUT. This then allows a single data "1" to properly shift along the positions of the register, selecting the appropriate memories to be latched. However if the CR command is followed by a LF command (which also is represented by a low bit #7), a second data "1" will be entered into the INPUT. These two data "1" would shift together along the positions of the register, resulting in an unworkable situation. FIG. 5, shows how to prevent this situation. When the CR command is followed by a LF command, both the INPUT, and T1 of register 36 are at data "1". This causes the output of NAND gate 64 to go low and hold one of the inputs of AND gate 65 low. Then when strobe line 1 causes inverter 37 to pulse high, the AND gate 65 will not allow a pulse to clock register 36. However, the next data sent will represent a letter, and thus the INPUT of register 36 will be low again, bringing the output of NAND gate 64 high, and allowing AND gate 65 to respond to the next strobe pulse. Since the INPUT of register 36 was low when clocked, only the data "1" on position T1 will shift as required along the positions of register 36.

Alternatively the system can be operated using an output of data from the serial port of the computer. These serial data can be converted to parallel data by circuitry, and applied as parallel input to the system. Serial/parallel converters are readily available and can be considered state of the art. However, there is no apparent advantage in using the serial port, since the system has to convert parallel data to serial data at the serial port with a UART chip, and then convert it back again to parallel data. Since the system is designed to operate with IBM compatible PC systems through a Centronics port, it will not operate directly with other non-IBM compatible systems. However, converters are available which convert the output from Apple and other systems to be Centronics compatible.

Also, instead of using direct wired connections between the computer and the data distribution system, current state of the art devices such as "Infra-red link", and "Radio link" are readily available, and can be used to make an animation system more convenient, and semi-portable. Also, instead of storing the script on a magnetic disc drive. after a script has been prepared and edited, a CD-ROM or other storage medium can be prepared and used with a suitable playback device to present the stored data to the system.

As mentioned above, centering control 43 (FIG. 2) can be used to make corrections in the positioning of motor drive systems. When the script calls for a centering correction, output terminal O of distributor 42 goes low for a predetermined period of time (typically several seconds). This causes the output of open collector inverter 70 to go open, thus allowing resistor 71 to control the speed of motor 29 during correction centering, in the manner already described with other speed settings. Typically a medium speed is used.

FIG. 6 shows output shaft 72 with attached stop cam 73 slightly angularly offset counter-clockwise from stop switch 74, leaving it in the open position. This allows resistor 75 (typically 2.2K ohms) to hold the input of inverter 76 high, thus holding one of the inputs of OR gate 49 low. Since the stop terminal @ is high while in centering operation, inverter 48 keeps the other input of OR gate 49 low, and its output is thus low, maintaining the OE terminal of motor driver 45 low, keeping motor 29 running. At the same time, the attached quadrant cam 77 is engaging switch 78 causing it to be in the closed position. Since output terminal O is low, current flows from it, through the closed switch 78, through diode 79, to hold the DIR terminal of motor driver 45 low. This causes motor 29 to run in a clockwise direction, with stop cam 73 advancing toward switch 74. When stop cam 73 reaches stop switch 74, it closes it. This brings the input of inverter 76 low, causing one input of OR gate 49 to go high. The output of gate 49 thus goes high, which brings the OE terminal of motor driver high, which stops the motor in the centered position.

If a centering correction was engaged with stop cam 73 slightly angularly offset clockwise from stop switch 74, quadrant cam 77 would not engage switch 78 so it would be open. This would allow resistor 47 to pull the DIR terminal of motor driver 45 high, and the motor would thus run in a counter-clockwise direction, until stop cam 73 actuates stop switch 74, coming from the other direction, thus stopping the motor in the centered position. Actually, it is necessary to allow a little overlap of the cams between the on/off positions of the switches, and thus the centering position with a clockwise correction is slightly different from that with a counter-clockwise correction. But this difference can be made very small, and is not significant. The arrangement as shown is typical of a one-hundred eighty degree range of movement of the output shaft, with the centering position approximately in the middle of that range. However, the centering position could be set anywhere within the range. A rotating output shaft as the actuated member is shown, but an alternative arrangement could be an actuated member that moves linearly, with the cams moving linearly to engage the switches. Other methods of detecting the centering positions could be used instead of cams such as Hall-effect sensors, reed switches or photo cells, or any other workable method.

Figure 7:
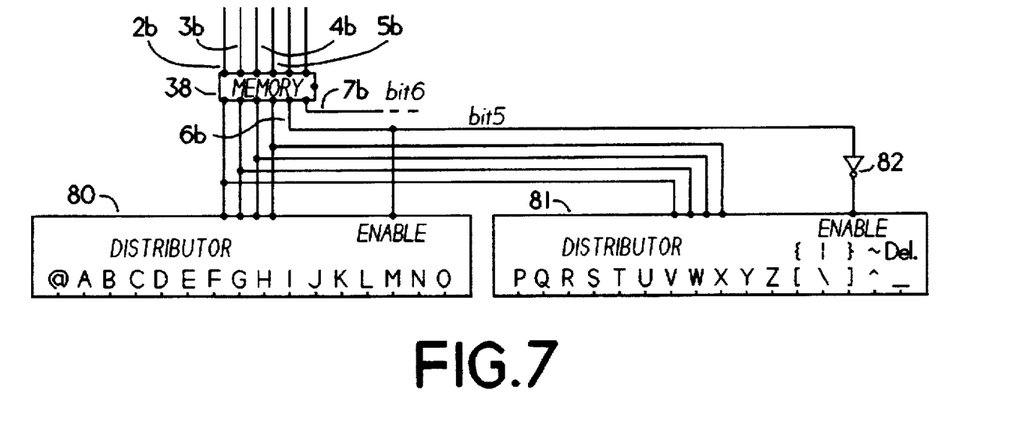
FIG. 7 illustrates a circuit for an increased number of speed variations.

The arrangement as shown in FIG. 2 uses fifteen letters of the alphabet (A through O) to control fifteen motor speeds with a single (1-of-16) distributor. Actually, these speeds are represented in columns four and six of FIG. 4. However, if a greater number of speeds are required, columns five and seven can also be employed. FIG. 7 shows two 1-of-16 distributors, 80, 81 which are used to represent the whole alphabet, plus nine punctuation marks. Distributor 80 represents the characters in columns four and six, and distributor 81, the characters in column five and seven. It can be seen in FIG. 4 that when columns four and six are used, bit #5 (i.e., b5) has a value of "0", and when columns five and seven are used, bit #5 has a value of "1". So in FIG. 7, line 6b which carries bit #5 is connected to the ENABLE input of distributor 80, thus enabling it, when representing columns four and six, and bit #5 having a value of "0". Line 6b is connected to the enable input of distributor 81, through inverter 82, enabling it to represent columns five and seven, when bit #5 has a value of "1". The output terminals of distributors 80, 81 (@,A through Z) can be connected to inverters and various resistors to control motor speeds, in the same manner as the output terminals of distributor 42, in FIG. 2. Bit #6 (i.e., b6) controls motor direction similarly. The nine punctuation marks in column five and seven of FIG. 4 can be used to give five additional speed variations, but this is a little inconvenient, since there is not a convenient combination of upper and lower case, of the same letters, to specify motor direction. A choice of different types of punctuation marks however, can be used to specify direction.

Figure 8:
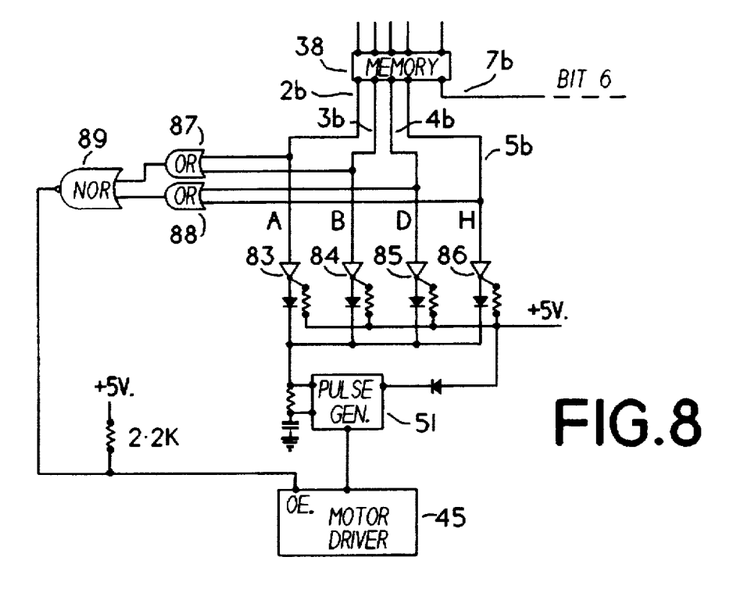
FIG. 8 illustrates a simpler circuit for a small number of speed variations.

If only a smaller number of speed variations are needed for a given motor, a simplified decoder as shown in FIG. 8, can be used. In this arrangement, distributor 42, as shown in FIG. 2, is not needed, and data lines 2b, 3b, 4b, 5b are connected directly to the inputs of open collector non-inverting drivers 83, 84, 85, 86, (typically 7417). The outputs of these drivers are connected to various sized current control resistors, and diodes, in the same manner as the inverters on the output of distributor 42 in FIG. 2, to control pulse generator 51 to produce various pulse frequencies. This simplified embodiment is made possible by the choice of the specific letters used to specify the required speeds. Referring to FIG. 4, the choice of "A", which is in Row one, causes bit #1 (i.e. b1) to go high, with bits #2, #3, #4 (i.e., b2, b3, b4) low. Since bit #1 is carried on data line 2b, this will send driver 83 high, and by using a low resistance current control resistor with driver 83, a high pulse frequency, and resulting high motor speed is achieved. Choosing "B", which is in Row two, causes bit #2, and thus driver 84 to be sent high, and if a higher current control resistor is used, it will cause a lower motor speed. Choices of "D", and "H" send respective bits #3, and #4 high, thus sending drivers 85, 86 high, and with still higher current control resistors connected, still slower speeds are attained. When the motor is to be stopped, "@" is selected, and this causes (as shown in FIG. 4) all bits to be low. Thus data lines 2b, 3b, 4b, 5b are all low (FIG. 8), and thus the inputs to OR gates 87, 88 are low. This holds the inputs to NOR gate 89 low and brings its output high, along with the output enable (OE) of motor driver 45, which causes the motor to be stopped. However, if any of data lines goes high, the output of NOR gate 89 goes low and allows the motor to run.

Control of memory latching and motor direction is the same with these two arrangements shown in FIGS. 7-8, as the previously described arrangement of FIG. 2. Memory 38 similarly holds the data from the data lines. Also, bit #6, carried on line 7b similarly controls motor direction.

Figure 9:
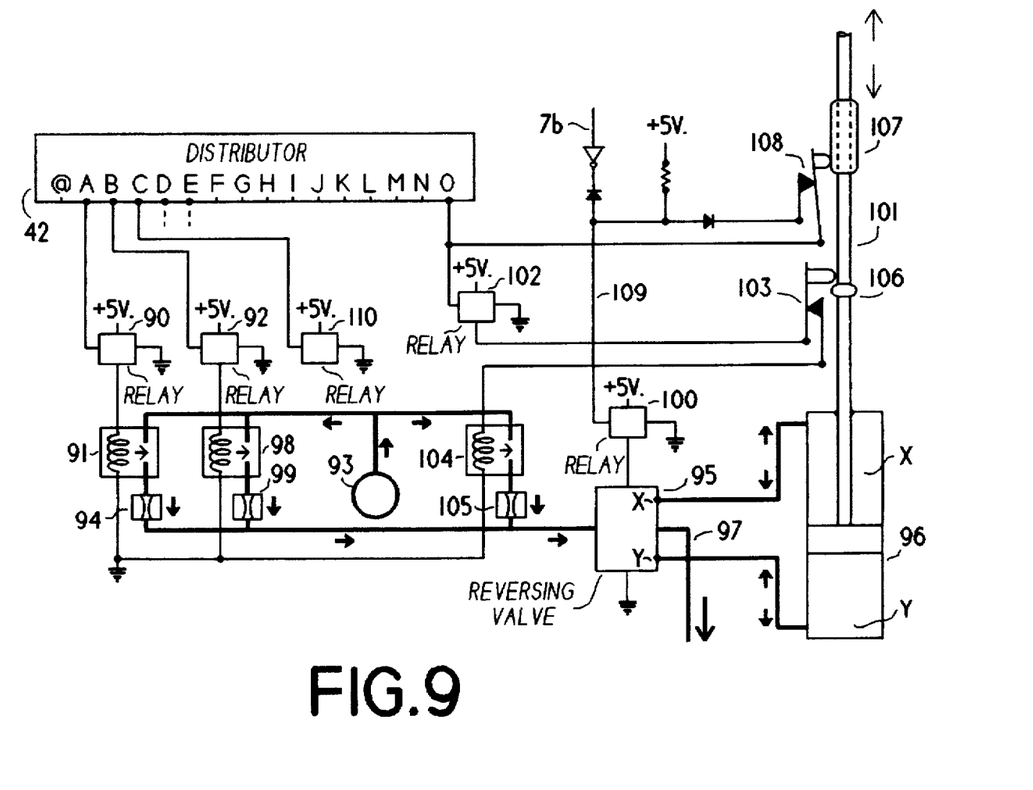
FIG. 9 shows an arrangement whereby the present invention can be used to provide variable speed hydraulic or pneumatic actuation.

FIG. 9 shows another embodiment for using the invention to control hydraulic or pneumatic actuators. Distributor 42 functions in the same manner as shown in FIG. 2 to send any selected output low. For example, to make actuation at the highest speed, output terminal A goes low and prevents current flow through the coil of relay 90. The normally closed contacts of relay 90 thus allow current to flow to activate solenoid valve 91. At this same time, terminal B and all other output terminals are high, energizing their respective relay coils, thus preventing current flow through the normally closed contacts of relay 92, and all other relays and solenoid valves. With solenoid valve 91 activated, hydraulic fluid (or air) flows through it from pump 93, through large sized restriction orifice 94, through the X port of reversing valve 95, to the X side of the piston of double acting actuator 96, causing it to move at the highest speed. Hydraulic fluid (or air) on the Y side of the piston is simultaneously forced back through the Y port of reversing valve 95 to return line 97 which can carry hydraulic fluid back to a reservoir, or vent pneumatic air to atmosphere. Further, the combination of the solenoid valves and orifices may be implemented by a single fluidic device receiving current through the relays as described above to control fluid flow through the fluidic device.

For a lower actuation speed, terminal B can be brought low. Terminal A thus goes high, shutting off flow through orifice 94. Relay 92 activates solenoid 98, allowing a flow through restriction orifice 99 which is of smaller size than orifice 94. This flow is less than the flow through orifice 94, so the speed of actuation is slower. Any of the output terminals of distributor 42 can be similarly used with solenoids and various sized orifices to give a wide range of speed variation. To achieve actuation in the reverse direction, line 7b, carrying bit #6, is used as in FIG. 2, but is now connected to relay 100 to activate reversing valve 95. When reversing valve 95 is activated, fluid flows from its Y port to the Y side of the actuator piston causing the piston to move in the reverse direction, and fluid is forced back from the X side of the piston, through the X port to return line 97. Reversing valve 95 may be implemented by a fluidic device to control fluid flow to vary the pressure about the piston for controlling the speed and direction as well as the position of the piston based on the decoded characters.

Relays 90, 92 are used to interface the outputs from distributor 42 to solenoid valves 91, 98 because distributor 42 is a TTL IC which cannot carry sufficient current to activate the solenoid valves. Relays 90, 92, 100, 110 can be of any low input current type or any other state of the art type of current amplifying devices, such as transistors, to achieve the interface. The hydraulic or pneumatic actuators may be used to control rheostats, variable resistors, robotic arms or other animation, or any other devices utilizing actuation by connection of the controllable devices to shaft 101.

Centering of the output shaft 101 can be achieved in a manner similar to that shown in FIG. 6 for electric motor drives. For centering, output terminal O is brought low, de-energizing relay 102. The normally closed contacts of relay 102 then allow current to flow through normally closed stop switch 103 to energize and open solenoid valve 104. Fluid flows through solenoid valve 104, through orifice 105 through port Y of reversing valve 95 to the Y side of the piston of actuator 96, causing the output shaft 101 to move along the longitudinal axis of the shaft in a direction toward distributor 42, and moving stop collar 106 toward stop switch 103. When stop collar 106 reaches stop switch 103 it opens it, stopping output shaft 101 in the centered position. Any time stop collar 106 is positioned between the piston of actuator 96 and stop switch 103, direction control collar 107 is in a position where it is pushing normally open direction control switch 108 closed, thus bringing line 109 low and de-energizing the coil of normally closed relay 100, thus energizing reversing valve 95, which causes the output shaft 101 to move along the longitudinal axis of the shaft toward distributor 42. If stop switch 103 is positioned between the piston of actuator 96 and stop collar 106 during centering, direction control switch 108 will be open, and thus cause output shaft 101 to move in the reverse, downward direction. Stop collar 106 will then stop movement at the centered position by engaging stop switch 103 coming from the opposite direction.

Alternatively, the invention can be used to control any device which is controllable by electrical switching. Relays 90, 92, 110, and any additional relays connected to any of the outputs of distributor 42, can be used to control individual lights to present a sequential light display, or they can be used to control a single light to varying degrees of brightness. They can be used to control sound effects, or to switch-in synthesized artificial speech components, and other pre-recorded audio, to synchronize with animation movements.

Further, the large memory capacity of the personal computer enables the system to control many types of pre-recorded performances. Specifically, light and water shows may be generated by controlling the activation and speed of water fountain pumps while synchronizing strobe lights with motorized aiming mechanisms. In this manner, a vast repertoire of performances may be designed and presented. Water can be either pumped in streams or cascaded from above. In addition, these arrangements provide for moving images being built up by the water and synchronization of the lights and water with music. Moreover, large powerful lights (focused strobe or laser) having motorized aiming mechanisms may be controlled to shine on a large flat fixed target or a high persistence screen and be synchronized to form large, high intensity moving images, especially useful for outdoor advertising signs.

Further, pre-recorded performances may be implemented for motorized actuator systems for puppets synchronized with dialogue or music, massage machines (especially for massaging the back), simulators for simulating multiple movements (e.g., flight or amusement park ride simulators), or devices playing musical instruments (i.e., piano, violin, flute, guitar and drums). The invention in combination with a pre-recorded performance may be used to implement a household or workplace event controller wherein a very slow scan rate, typically one line per minute, may control power to lights and appliances and set the heating and cooling systems, thereby having an anti-burglary feature of giving the appearance of presence of people in the building or dwelling. Medical therapy applications are also conceivable wherein stimulation of multiple muscles by various stimuli (e.g., electrical current, mechanical pressure, touch sensation, vibration, verbal commands, etc.) may be controlled to provide exercise and nervous system rehabilitation. In addition, the system may be adapted to industrial applications to compete with, and function similarly to, computer numerical control (CNC) systems by using the centering feature and limit switches to control position, thereby providing a simpler, less expensive system with good applications for material handling.

Throughout the above disclosure many electronic components and associated circuitry have been described for use in the embodiments of the invention, and many such devices could be replaced by other equally effective state of the art devices, without detracting from the novelty of the invention.

What is claimed is:

1. An apparatus for controlling a plurality of controllable devices wherein each of said controllable devices includes a plurality of different control settings with each of said control settings corresponding to a character of a predetermined set of characters, said apparatus comprising:

a file for storing a plurality of said characters to control each of said controllable devices pursuant to a predetermined script;

personal computer means for processing said file, said personal computer means including:

input means for entering said plurality of characters into said file;

manipulation means for creating and editing said file to arrange the entered characters in a predetermined sequence;

editing means for arranging said entered characters into lines of script wherein each line comprises a plurality of said entered characters equal in number to the number of said controllable devices, wherein each of said entered characters in said line relates to a different controllable device, and wherein the identity of each of said entered characters corresponds to one of said control settings such that the characters relating to each controllable device are in the same order in all said lines of script;

keyboard means included in said editing means for inserting a carriage return code at the end of each of said lines of script and thereby establish said lines of script;

memory means for storing said file;

encoding means for encoding said entered characters and carriage return codes stored in said file for transmission;

output port means operative in response to a plurality of command signals for transmitting separately each of said encoded entered characters and carriage return codes pursuant to said predetermined script whereby each of said plurality of command signals causes a single one of said encoded entered characters or one carriage return code to be transmitted;

printer port means for transmitting said encoded entered characters and carriage return codes in the sequence of said predetermined script; and pulse source means for issuing said plurality of command signals at predetermined evenly spaced time intervals; and interface means for decoding said encoded entered characters received from said output port means and controlling each of said controllable devices in accordance with the control settings corresponding to said decoded entered characters, said interface means including:

a plurality of memories wherein each said memory is associated with one of said controllable devices for storing said entered characters from said file corresponding to said control settings of said one of said controllable devices;

a shift register for enabling said entered characters from said file transmitted from said output port means to be latched sequentially into each of said memories in sequences corresponding to said lines of script;

data detection means for detecting said carriage return code at the end of each of said lines of script thereby controlling said shift register to begin a new sequence corresponding to each new line of script; and a plurality of distribution means, wherein each said distribution means is associated with one said controllable device and one associated memory for decoding said entered characters latched in each said associated memory, each said distribution means including a plurality of terminals with each of said terminals being associated with a respective one of the control settings for the associated controllable device such that at any time only the terminal associated with the control setting corresponding to said entered character latched in said associated memory at that time is held at a first predetermined voltage while others of said terminals are held at a second predetermined voltage.

2. The apparatus of claim 1 wherein said entered characters are upper and lower case letters and said encoding means further includes means for encoding said entered characters using an ASCII code.

3. The apparatus of claim 2 wherein each said controllable device is an electric stepper motor, and each said distribution means further includes:

variable frequency pulse generator means wherein a plurality of inputs control output pulse frequency such that, when said first predetermined voltage is applied selectively and separately to each of said plurality of inputs, different predetermined output pulse frequencies are produced;

electrical connections between each of said terminals and corresponding said plurality of inputs;

motor driver means for controlling the speed of said stepper motor, wherein said output pulse frequencies are used to directly control the speed of said stepper motor in accordance with said control settings corresponding to said decoded entered characters;

data decoding means for determining the case of each of said upper and lower case letters;

direction control means for sending a control signal from said data decoding means to the direction control input of said motor driver means thereby controlling the direction of rotation of said associated motor such that upper case letters cause a predetermined direction of rotation and lower case letters cause the reverse direction of rotation.

4. The apparatus of claim 2 wherein each said controllable device is a fluid-driven actuator and each said distribution means further includes:

control means for controlling one associated fluid-driven actuator according to said control settings via connecting means from said terminals, said control means including a plurality of solenoid valve means for fluid control wherein each solenoid valve means is connected electrically to one of said plurality of terminals thereby allowing fluid flow through only the solenoid valve means connected to the terminal held at said first predetermined voltage based on said decoded entered character;

a pump for pumping fluid through said plurality of solenoid valve means;

a plurality of restriction orifices wherein each restriction orifice is coupled to one of said plurality of solenoid valve means and has a restriction rate different from others of said restriction orifices to limit fluid flow for controlling said associated fluid-driven actuator in accordance with one of said control settings;

common connection means enabling fluid flow from said pump to said plurality of solenoid valve means and for receiving said fluid flow from said plurality of restriction orifices;

a reversing valve coupled to said common connection means for directing fluid flow from said plurality of orifices;

an actuating piston with a shaft wherein said actuating piston is driven by said fluid flow from said reversing valve to manipulate said shaft and generate said actuation of said fluid-driven actuator;

data decoding means for determining the case of each of said upper and lower case letters;

direction control means whereby said data decoding means sends a control signal to said reversing valve to control the direction of said actuation of said associated fluid-driven actuator such that upper case letters cause a predetermined direction of said actuation and lower case letters cause the reverse direction of said actuation.

\* \* \* \* \*